(12) United States Patent
Mooney et al.

(10) Patent No.: US 8,165,072 B2
(45) Date of Patent: Apr. 24, 2012

(54) METHOD FOR PROVIDING GROUP PAGING AND MESSAGING

(75) Inventors: Christopher F Mooney, Livingston, NJ (US); Yang Yang, Morris Plains, NJ (US); Jialin Zou, Randolph, NJ (US)

(73) Assignee: Alcatel Lucent, Paris (FR)

( * ) Notice: Subject to any disclaimer, the term of this patent is extended or adjusted under 35 U.S.C. 154(b) by 799 days.

(21) Appl. No.: 11/837,028

(22) Filed: Aug. 10, 2007

(65) Prior Publication Data

US 2008/0232293 A1  Sep. 25, 2008

Related U.S. Application Data

(60) Provisional application No. 60/919,403, filed on Mar. 22, 2007.

(51) Int. Cl.
*H04Q 7/00* (2006.01)
(52) U.S. Cl. .................................. 370/329; 370/338
(58) Field of Classification Search .................. 370/328, 370/329, 338, 345, 346, 349, 389, 392, 401
See application file for complete search history.

(56) References Cited

U.S. PATENT DOCUMENTS

| | | | | |
|---|---|---|---|---|
| 5,752,202 A | | 5/1998 | Obright | 455/574 |
| 6,694,149 B1 * | | 2/2004 | Ady et al. | 455/522 |
| 6,856,603 B1 * | | 2/2005 | Vollmer et al. | 370/311 |
| 6,876,636 B2 * | | 4/2005 | Sinnarajah et al. | 370/312 |
| 7,075,904 B1 * | | 7/2006 | Manish et al. | 370/312 |
| 7,167,895 B1 * | | 1/2007 | Connelly | 709/203 |
| 7,839,948 B2 * | | 11/2010 | Walker et al. | 375/295 |
| 2005/0277429 A1 | | 12/2005 | Laroia et al. | 455/458 |
| 2006/0274780 A1 * | | 12/2006 | Walsh et al. | 370/458 |
| 2007/0058653 A1 * | | 3/2007 | Harris et al. | 370/432 |
| 2008/0084878 A1 * | | 4/2008 | Akbar et al. | 370/390 |
| 2008/0170526 A1 * | | 7/2008 | Narang et al. | 370/311 |

FOREIGN PATENT DOCUMENTS

| | | |
|---|---|---|
| EP | 0 796 025 A2 | 9/1997 |
| EP | 1 513 368 A2 | 3/2005 |

OTHER PUBLICATIONS

International Search Report and Written Opinion dated Jul. 17, 2008.

* cited by examiner

*Primary Examiner* — Ricky Ngo
*Assistant Examiner* — Christine Ng
(74) *Attorney, Agent, or Firm* — Williams, Morgan & Amerson, PC

(57) ABSTRACT

The present invention provides a method of providing a group paging message. One embodiment of the method includes providing a first message during a first portion of a predetermined time period. The first message includes information indicating a second portion of the predetermined time period during which at least one idle first mobile unit is to wake up and attempt to receive a second message from the base station (s). The embodiment of the method also includes providing a third message during a third portion of the predetermined time period. The third message includes information indicating the second portion of the predetermined time period during which at least one idle second mobile unit is to wake up and attempt to receive the second message. The third portion of the predetermined time period is different than the first portion.

24 Claims, 3 Drawing Sheets

METHOD FOR PROVIDING GROUP PAGING AND MESSAGING

RELATED APPLICATIONS

The present application claims priority to provisional application Ser. No. 60/919,403, filed Mar. 22, 2007, the entire specification, claims and figures of which are each incorporated herein by reference without disclaimer.

BACKGROUND OF THE INVENTION

1. Field of the Invention

This invention relates generally to communication systems, and, more particularly, to wireless communication systems.

2. Description of the Related Art

Conventional wireless communication systems typically include a plurality of base stations (e.g., Node Bs) that provide wireless connectivity over a corresponding plurality of geographic areas or cells. Mobile units within the area serviced by the base stations may access the system by establishing a wireless communication link with one of the base stations. Typically, each mobile unit maintains communications with the system as it passes through an area by communicating with a series of base stations that provide wireless connectivity to the cells that are visited by the mobile unit. The mobile unit may communicate with the closest base station, the base station with the strongest signal, the base station with a capacity sufficient to accept communications, or some combination of base stations selected according to these handoff rules or other handoff rules. Communications between the mobile unit and the base station are wireless and are often referred to as taking place over the air interface.

Communications between the mobile units and the base stations may include voice and/or high-speed data. High speed wireless data systems such as Evolution-Data Optimized (EVDO Rev.A), Universal Mobile Telecommunications System (UMTS), High-Speed Downlink Packet Access (HSDPA), E-DCH and Evolution Data and Voice (EVDV) have significantly improved the air interface channel data rates to support various packet data services that require high-speed channels. In addition, multiple standards are defined to efficiently support applications that require large-data transfers, such as continuously running data flows for broadcast or multicast over the air interface. However, support for fast and flexible transmissions of short messages or data information to a group of users (active or idle) is lacking in all existing 3G air interface standards. Current standards only specify how to handle data flows and streaming applications. There is no per-message multicast capability in existing cellular wireless standards. Instead, short messages are sent to individual users using a unicast method. The process involves locating users, setting up traffic channels and sending the message over each traffic channel using unicast messages. Sending the same short message to multiple users through unicast process incurs longer delays and inefficient use of the air interface and system resources.

One example of a technique for locating users and then transmitting unicast messages to these users is known as quick paging of idle mobile units. In quick paging, each idle mobile unit periodically wakes up during a predetermined portion of a paging or wake-up cycle. When the idle mobile unit wakes up during the predetermined portion of the wake-up cycle, it attempts to detect a quick paging message that indicates that a paging message is going to be unicast to this mobile unit during a subsequent portion of the wake-up cycle. The different mobile units are assigned to different portions of the wake-up cycle so that they do not inadvertently detect a paging message that is directed to a different mobile unit. For example, different mobile units may be assigned different offsets within the wake-up cycle. Thus, quick paging messages and unicast paging messages destined for different mobile units can be distinguished by transmitting them in the different portions of the wake-up cycle assigned to the different mobile units.

FIG. 1 shows a conventional time sequence 100 of successive control cycles 105 that form a wake-up cycle 110. Each wake-up cycle 110 in FIG. 1 includes 12 control cycles 105 and each control cycle 105 comprises 256 slots. An idle mobile unit may wake up during the first control cycle 105 (labeled with "1") of each wake-up cycle 110 and attempt to decode a quick page that has been transmitted by a base station. If the idle mobile unit detects a quick page, which indicates that a unicast paging message is going to be transmitted to the mobile unit, then it may remain awake for the subsequent control cycle 105 (labeled with "2") and attempt to decode the unicast paging message. Other idle mobile units may be assigned to other control cycles 105 and may therefore monitor these control cycles 105 to detect quick pages that are directed to these mobile units. For example, another idle mobile unit may wake up during the sixth control cycle 105 (labeled with "6") of each wake-up cycle 110 and attempt to decode a quick page that has been transmitted by a base station. If the idle mobile unit detects a quick page, which indicates that a unicast paging message is going to be transmitted to the mobile unit, then it may remain awake for the subsequent control cycle 105 (labeled with "7") and attempt to decode the unicast paging message.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for providing a group paging message. One embodiment of the method includes providing a first message during a first portion of a predetermined time period. The first message includes information indicating a second portion of the predetermined time period during which at least one idle first mobile unit is to wake up and attempt to receive a second message from the base station(s). The embodiment of the method also includes providing a third message during a third portion of the predetermined time period. The third message includes information indicating the second portion of the predetermined time period during which at least one idle second mobile unit is to wake up and attempt to receive the second message. The third portion of the predetermined time period is different than the first portion.

BRIEF DESCRIPTION OF THE DRAWINGS

The invention may be understood by reference to the following description taken in conjunction with the accompanying drawings, in which like reference numerals identify like elements, and in which.

Figure 1:
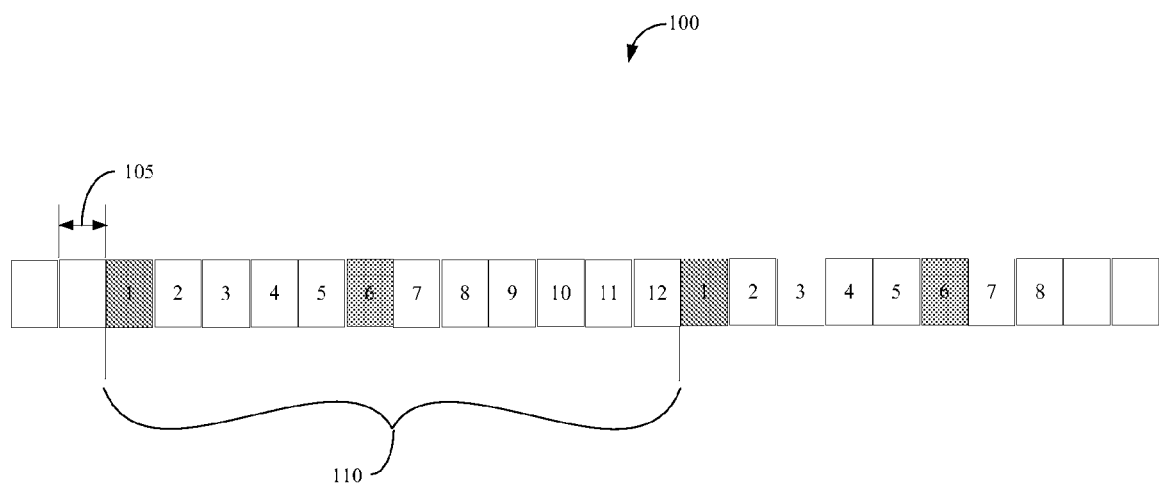
FIG. 1 shows a conventional time sequence of successive control cycles that form a wake-up cycle.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
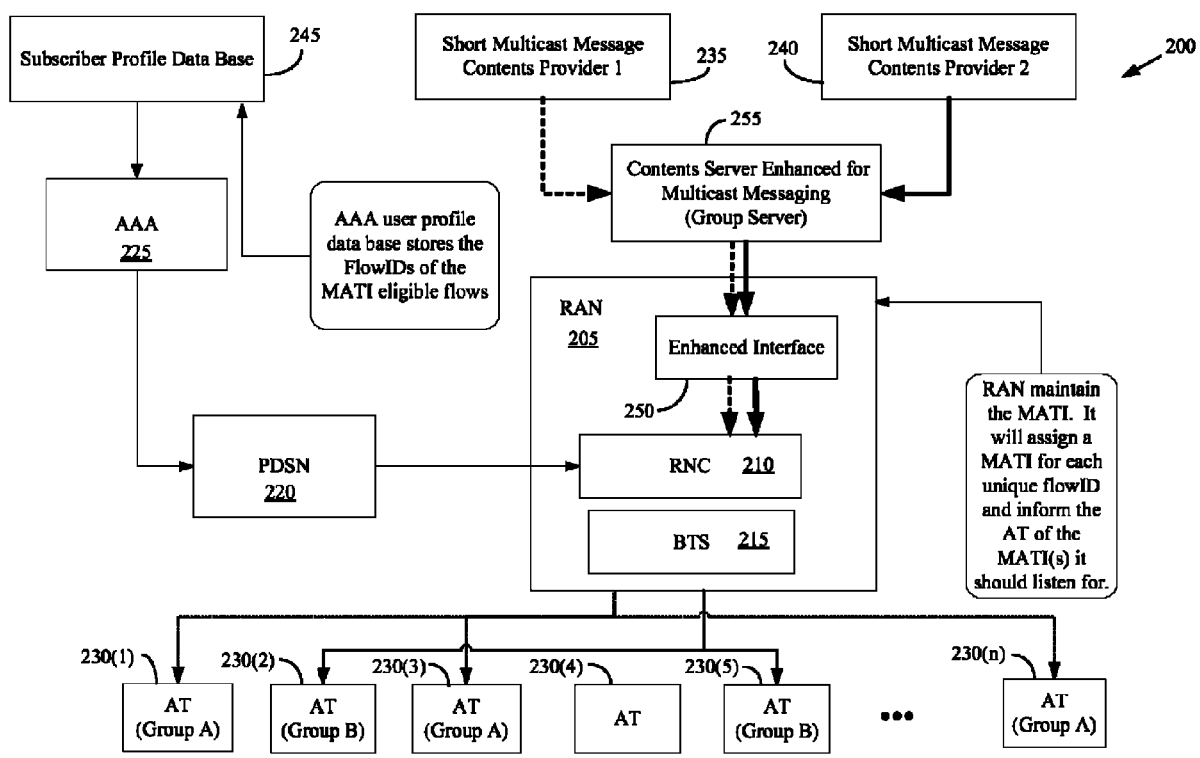
FIG. 2 conceptually illustrates one exemplary embodiment of a wireless communication system that implements an end-to-end network solution for broadcast and multicast short messaging, in accordance with the present invention.

FIG. 2 conceptually illustrates one exemplary embodiment of a wireless communication system 200. In the illustrated embodiment, the wireless communication system 200 includes a radio access network (RAN) 205 that is used to provide wireless connectivity. The radio access network 205 includes a radio network controller (RNC) 210 and one or more base transceiver stations (BTS) 215. The radio network controller 210 may communicate with a packet data serving node (PDSN) 220 and an access, authorization, and accounting (AAA) server 225. Techniques for implementing and/or operating the radio access network 205, the radio network controller 210, the base stations 215, the packet data serving node 220, and the access, authorization, and accounting server 225 are known in the art and in the interest of clarity only those aspects of implementing and/or operating these entities that are relevant to the present invention will be discussed further herein. Furthermore, persons of ordinary skill in the art having benefit of the present disclosure should appreciate that in alternative embodiments other configurations of the wireless communication system 200 may also be used to provide wireless connectivity.

Access terminals 230(1-n) may access the wireless communication system 200 over air interfaces with the radio access network 205 or other access networks that are not shown in FIG. 2. The indices (1-n) may be used to indicate individual access terminals 230(1-n) or subsets of the access terminals 230(1-n). However, the indices may be dropped when referring to the access terminals 230 collectively. This convention may be applied to other elements shown in the drawings and indicated by a numeral and one or more distinguishing indices. The access terminals 230 may also be referred to as mobile units, mobile stations, subscriber stations, and the like. Exemplary access terminals 230 include cellular telephones, personal data assistants, smart phones, short message devices, paging devices, network interface cards, notebook computers, and desktop computers.

Users of the access terminals 230 may subscribe to one or more broadcast or multicast messaging services. As used herein, the term "message" will be used to refer to information of a predetermined size, e.g., a predetermined number of bytes, and the message is transmitted in a selected number of packets. Messages therefore have a predetermined beginning and end. In contrast, conventional streaming or data flows typically do not have a predetermined size and information that is streamed is transmitted substantially continuously over a relatively long period of time. Furthermore, messages may be transmitted over signaling channels that are used to transmit system information and streaming or data flows are transmitted only over traffic channels. In the illustrated embodiment, the access terminals 230(1, 3, n) are members of Group A and are subscribed to a multicast service provided by a first multicast content provider 235. Access terminals 230(2, 5) are members of Group B and are subscribed to a different multicast service provided by a second multicast content provider 240. Access terminal 230(4) is not subscribed to a multicast service. The access terminals 230 may be paged and instructed to wake up to receive messages associated with the subscribed messaging services. A user of one of the access terminals 230 may subscribe to (or unsubscribe from) multiple unicast and/or broadcast services and so groups of access terminals 230 associated with each messaging service cannot be preconfigured to wake up at the same slot to receive the associated messages. Instead, a group wake up triggered by the multicast application dynamically may be implemented, as described herein.

Information associated with the access terminals 230 that are subscribed to various multicast services may be stored in a subscriber profile database 245. The information in the database 245 may be used by the AAA 225 to control access to the multicast services, to authenticate the subscribers, and/or to assist in accounting for usage of the multicast services by the subscribers. In one embodiment, the subscriber profile database 245 includes user profiles associated with all the access terminals 230 that are subscribed to one or more of the multicast services provided by the wireless communication system 200. The user profiles may include identifiers that indicate the multicast data flows that are associated with each of the subscribed access terminals. For example, a first identifier may be included in the profile entries for the access terminals 230(1, 3, n) to indicate that they are subscribed to the multicast dataflow provided by the multicast content provider 235. This dataflow is indicated by the boldface dashed line. A second identifier may be included in the profile entries for the access terminals 230(2, 5) to indicate that they are subscribed to the multicast dataflow provided by the multicast content provider 240. This dataflow as indicated by the boldface solid line.

The radio access network 205 includes an enhanced interface 250 that may be used to receive multicast information provided by the content providers 235, 240 and assist in providing this information to the appropriate access terminals 230. In one embodiment, the enhanced interface 250 (or some other functionality in the radio access network 205) creates and maintains identifiers that are associated with each of the multicast content flows associated with the radio access network 205. For example, the identifiers may be referred to as multicast access terminal identifiers (MATI). The radio access network 205 may map the flow identifiers associated with different data flows to different multicast access terminal identifiers and then provide the multicast access terminal identifiers to the appropriate access terminals 230. For example, the radio access network 205 provides a first multicast access terminal identifier associated with the dataflow provided by the content provider 235 to the access terminals 230(1, 3, n). The radio access network 205 may also provide a second multicast access terminal identifier associated with the dataflow provided by the content provider 240 to the access terminals 230(2, 5). The multicast access terminal identifiers may then be placed in the headers of packets associated with the difference data flows and used by the access terminals 230 to identify packets that are part of their subscribed multicast services.

In the illustrated embodiment, the wireless communication system 200 also includes a multicast content server 255 that may be used to coordinate operation of the different content providers 235, 240. For example, one or more of the content providers 235, 240 may provide multicast data (or an indication that multicast data is available for transmission) to the multicast content server 255, which may then provide a request to deliver this content to the radio access network 205. If the radio access network 205 approves the request, then the multicast content server 255 delivers the content provided by the content provider 235, 240 and the flow identifier associated with this multicast dataflow. The radio access network 205 may then map the flow identifier to the appropriate multicast access terminal identifier, which may be added to the media access control (MAC) header of each packet of multicast content. The radio access network 205 may also assign the dedicated MAC-IDs for the broadcast control channel and the associated channel resources to the multicast packets.

The short messages provided by the multicast content providers 235, 240 may be associated with a specifically defined multicast short messaging type that is similar to the Data-Over-Signaling messaging type that is used in EVDO. One multicast data message type may be defined for the data messaging and another multicast signaling message type may be defined for the signaling and/or configuration messages for a group of access terminals 230. The multicast signaling and/or configuration messages may be generated by applications in the content providers 235, 240 or they may alternatively be generated at the radio access network 205. The radio access network 205 may associate the data contents provided by the content providers 235, 240 with the appropriate data message type and the signaling contents provided by the content providers 235, 240 may be associated with the appropriate signaling message type. For example, in a system that operated according to the EVDO standards, a new message type say Multicast-Data-Over-Signaling maybe added to support multicast messaging. Alternatively, in a system that operates according to the UMB standards, a dedicated stream such as "stream 9" could be added to support multicast messaging.

When the radio access network 205 has information ready for transmission to access terminals 230 in one or more of the subscriber groups associated with the content providers 235, 240, the radio access network 205 may provide quick paging messages to the appropriate access terminals 230 instructing these access terminals to wake up during a selected period of time to receive the multicast transmission. However, the idle access terminals 230 in each group may be assigned different time periods to receive the quick paging messages. The radio access network 205 may therefore provide quick paging messages that indicate a future time period during which the multicast content will be transmitted to the subscribed access terminals 230. The subscribed access terminals 230 may therefore receive these quick paging messages at different time intervals and then all of the subscribed access terminals 230 can wake up during the same time interval to receive the multicast transmission. For example, the access terminal 230(1) may receive a quick paging message during a first time slot, the access terminal 230(3) may receive the quick paging message during a second time slot, and the access terminal 230(n) may receive the quick paging message during a third time slot. The quick paging message may indicate that a multicast transmission associated with Group A will take place during a subsequent, fourth time slot and so the access terminals 230(1, 3, n) may all wake up during the fourth time slots to receive the multicast transmission.

Figure 3:
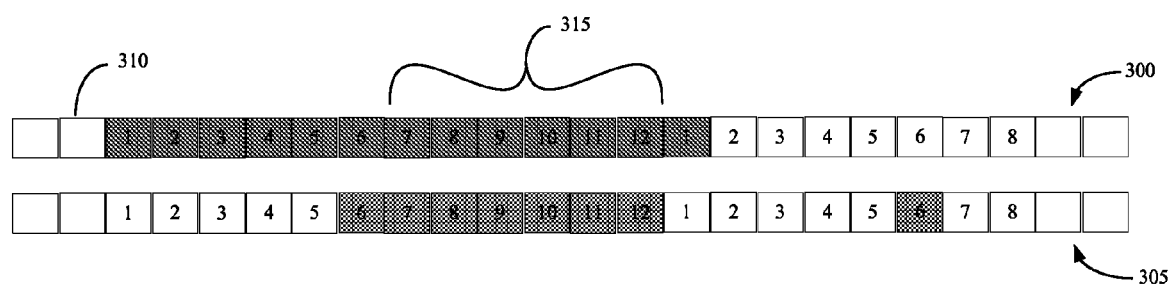
FIG. 3 conceptually illustrates a first exemplary embodiment of a time sequence of successive control cycles that form a wake-up cycle, in accordance with the present invention.

FIG. 3 conceptually illustrates a first exemplary embodiment of time sequences 300, 305 associated with two access terminals. In the illustrated embodiment, the time sequences 300, 305 include a plurality of control cycles 310 (only one indicated by a numeral in FIG. 3) that are grouped into wake-up cycles that each include 12 control cycles 310. The first access terminal receives a quick paging message in the first control cycle 310, which is indicated by the numeral "1." The quick paging message indicates that the access terminal should wake-up and remain awake for all of the subsequent control cycle 310 in the current wake-up cycles. For example, the quick paging message may include a word formed by encoding a series composed entirely of binary values of 1, which indicates that the access terminal should wake-up for the remaining control cycles 310 in the current wake-up cycle. Thus, the first access terminal is able to receive multicast transmissions during the control cycles 2-12 of the current wake-up cycle. The second access terminal receives a quick paging message in the sixth control cycle 310, which is indicated by the numeral "6." The quick paging message indicates that the second access terminal should wake-up and remain awake for all of the subsequent control cycles 310 in the current wake-up cycles, e.g., control cycles 7-12. Thus, a group multicast message transmitted to both of the access terminals (as well as any other access terminals in the group that have been awakened) may be received during the control cycles 7-12, as indicated by the group 315.

Figure 4:
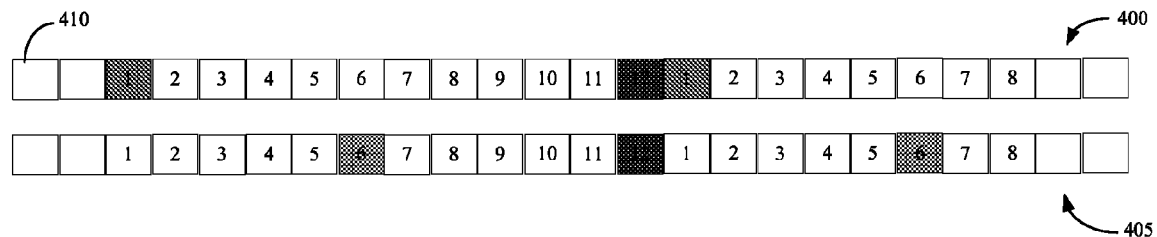
FIG. 4 conceptually illustrates a second exemplary embodiment of a time sequence of successive control cycles that form a wake-up cycle, in accordance with the present invention.

FIG. 4 conceptually illustrates a second exemplary embodiment of time sequences 400, 405 associated with two access terminals. In the illustrated embodiment, the time sequences 400, 405 include a plurality of control cycles 410 (only one indicated by a numeral in FIG. 4) that are grouped into wake-up cycles that each include 12 control cycles 410. The first access terminal receives a quick paging message in the first control cycle 410. The quick paging message indicates that the access terminal should wake-up during the last ($12^{th}$) control cycle 410 in the current wake-up cycle. For example, the quick paging message may include a word formed by encoding a series composed entirely of binary values of 1, which indicates that the access terminal should wake-up for the last control cycles 410 in the current wake-up cycle. Alternatively, the quick paging message may include information that indicates which control cycle (or combination of control cycles) will include the multicast transmission. The second access terminal receives a quick paging message in the sixth control cycle 410. The quick paging message indicates that the second access terminal should wake-up in the last control cycle 410 in the current wake-up cycle. Thus, a group multicast message transmitted to both of the access terminals (as well as any other access terminals in the group that have been awakened) may be received during the last control cycle 410.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method, comprising:
providing, from at least one base station and over an air interface, a first message during a first control cycle of a first wake-up cycle, wherein the first wake-up cycle is one of a plurality of wake-up cycles, wherein the same number of control cycles are in each of the plurality of wake-up cycles, and wherein the first message comprises information indicating that at least one idle first mobile unit is to wake up and attempt to receive a second message from said at least one base station only in the first wake-up cycle, during at least one second control cycle thereof; and
providing, from said at least one base station and over the air interface, a third message during a third control cycle of the first wake-up cycle, the third message comprising information indicating that at least one idle second mobile unit is to wake up and attempt to receive the second message only in the first wake-up cycle, during said at least one second control cycle thereof.

2. The method of claim 1, wherein said at least one second control cycle is subsequent to the first control cycle and the third control cycle.

3. The method of claim 1, wherein said at least one first idle mobile unit and said at least one second idle mobile unit do not wake-up during said at least one second control cycle in a second wake-up cycle subsequent to the first wake-up cycle.

4. The method of claim 1, wherein providing the first message comprises providing a first message comprising information indicating that said at least one idle first mobile unit is to wake up during a control cycle immediately following the first control cycle of the first wake-up cycle and remain awake until the end of the first wake-up cycle.

5. The method of claim 4, wherein providing the third message comprises providing the third message comprising information indicating that said at least one idle second mobile unit is to wake-up during a control cycle immediately following the third control cycle of the first wake-up cycle and remain awake until the end of the first wake-up cycle.

6. The method of claim 1, wherein providing the first message comprising comprises providing a first message comprising information indicating that said at least one idle first mobile unit is to remain idle until said at least one second control cycle of the first wake-up cycle.

7. The method of claim 6, wherein providing the third message comprises providing a third message comprising information indicating that said at least one idle second mobile unit is to remains idle until said at least one second control cycle of the first wake-up cycle.

8. The method of claim 1, comprising multicasting the second message to said at least one first mobile unit and said at least one second mobile unit during said at least one second control cycle of the first wake-up cycle.

9. The method of claim 8, wherein multicasting the second message comprises multicasting at least one of a paging message, a multicast signaling message for signaling and configuration of a group of access terminals, or a multicast data message.

10. The method of claim 9, wherein multicasting the second message comprises selecting a multicast data message type for transmitting data contents or selecting a multicast signaling message type for transmitting signaling contents.

11. The method of claim 8, wherein multicasting the second message comprises:
receiving a flow identifier associated with the second message from a content provider;
determining that said at least one first mobile unit and said at least one second mobile unit are eligible to receive the second message based on the flow identifier; and
multicasting the second message including an identifier associated with a group including said at least one first mobile unit and said at least one second mobile unit.

12. The method of claim 11, wherein determining that said at least one first mobile unit and said at least one second mobile unit are eligible to receive the second message comprises:
providing the flow identifier to an authentication, authorization, and accounting (AAA) server; and
receiving an indication from the AAA server that said at least one first mobile unit and said at least one second mobile unit are eligible, the AAA server determining eligibility based upon user profiles associated with said at least one first mobile unit and said at least one second mobile unit.

13. The method of claim 11, wherein multicasting the second message comprises:
mapping the flow identifier to the identifier associated with the group; and
providing information indicating the identifier to the group so that mobile units in the group can access the multicast messages using the identifier.

14. The method of claim 8, wherein multicasting the second message comprises multicasting a second message including an associated media access control identifier.

15. A method, comprising:
receiving, at a first mobile unit, a first message transmitted by at least one base station during a first control cycle of a first wake-up a cycle, wherein the first wake-up cycle is one of a plurality of wake-up cycles, wherein the same number of control cycles are in each of the plurality of wake-up cycles, and wherein the first message comprises information indicating that the first mobile unit is to wake up and attempt to receive a second message from said at least one base station only in the first wake-up cycle, during at least one second control cycle thereof, said at least one second control cycle also being indicated in a third message transmitted to at least one second mobile unit during at least one third control cycle of the first wake-up cycle, the third message comprising information indicating that said at least one second mobile unit is to wake up and attempt to receive the second message during only in the first wake-up cycle, during said at least one second control cycle thereof.

16. The method of claim 15, wherein said at least one second control cycle is subsequent to the first control cycle and the third control cycle.

17. The method of claim 15, wherein receiving the first message comprises receiving a first message comprising information indicating that the first mobile unit is to wake up for the control cycles in the first wake-up cycle subsequent to the first control cycle.

18. The method of claim 15, wherein receiving the first message comprises receiving a first message comprising information indicating that the first mobile unit is to remain idle until said at least one second control cycle of the first wake-up cycle.

19. The method of claim 15, comprising:
waking up the first mobile unit during said at least one second control cycle of the first wake-up cycle; and
receiving at least one message that is multicast to the first mobile unit and said at least one second mobile unit during said at least one second control cycle of the first wake-up the cycle.

20. The method of claim 19, wherein receiving said at least one multicast message comprises receiving at least one of a multicast paging message, a multicast data message, or a multicast signaling message.

21. The method of claim 19, wherein receiving said at least one multicast message comprises identifying said at least one multicast message based on an identifier associated with a group including the first mobile unit and said at least one second mobile unit, the identifier being included in said at least one multicast message.

22. The method of claim 21, comprising receiving information indicative of the identifier associated with the group, the identifier having been mapped to a flow identifier associated with said at least one multicast message.

23. A method, comprising:
providing, from at least one base station and over an air interface, a first message during a first control cycle of a first wake-up cycle, wherein the first wake-up cycle is one of a plurality of wake-up cycles, wherein each wake-up cycle has a predetermined number of control cycles, and wherein the first message comprises information indicating that at least one idle first mobile unit is to wake up and attempt to receive a second message from said at least one base station only in the first wake-up cycle, during at least one second control cycle thereof; and
providing, from said at least one base station and over the air interface, a third message during a third control cycle of the first wake-up cycle, the third message comprising information indicating that at least one idle second mobile unit is to wake up and attempt to receive the second message only in the first wake-up cycle, during said at least one second control cycle thereof.

24. The method of claim 23, wherein each wake-up cycle has the same predetermined number of control cycles in each of the plurality of wake-up cycles.

* * * * *